United States Patent [19]
Tamaki et al.

[11] 4,009,502
[45] Mar. 1, 1977

[54] WIPER DEVICE

[75] Inventors: Sumio Tamaki, Kariya; Isao Ito, Handa, both of Japan

[73] Assignee: Nippondenso Co., Ltd., Kariya, Japan

[22] Filed: Aug. 19, 1975

[21] Appl. No.: 605,883

[30] Foreign Application Priority Data

Sept. 9, 1974 Japan ............... 49-108282[U]
Feb. 27, 1975 Japan ............... 50-27363[U]

[52] U.S. Cl. .................... 15/250.27; 15/250.31
[51] Int. Cl.² ............................................ B60S 1/08
[58] Field of Search ....... 15/250.27, 250.3, 250.31, 15/250.34; 74/70, 75

[56] References Cited

UNITED STATES PATENTS 3,113,334  12/1963  Howard .................. 15/250.14
3,665,772  5/1972  Beard et al. .............. 15/250.27
3,688,333  9/1972  Cimino et al. ............ 15/250.31

FOREIGN PATENTS OR APPLICATIONS 2,117,342  4/1971  Germany .................. 15/250.31

Primary Examiner—Peter Feldman
Attorney, Agent, or Firm—Cushman, Darby & Cushman

[57] ABSTRACT

A wiper device in which the driving force is transmitted to wiper arms through link structures so that wiper blades are reciprocated in a synchronized manner. The link in one link structure has pin means for receiving the driving force from driving means through a crank arm and another pin means which is different from the first-mentioned pin means and transmits the driving force to the link in the other link structure.

3 Claims, 8 Drawing Figures

WIPER DEVICE

BACKGROUND OF THE INVENTION

1. Field of the Invention

This invention relates to an improved construction of a wiper device for wiping the windowpanes of cars, ships, and the like.

2. Description of the Prior Art

FIG. 1 illustrates one of the wiper devices which have been publicly known. In this wiper device, a wiper motor 1 is arranged intermediate between supporting plates 6 and 6a in order to decrease the overall length of the rod, and links 3 and 4 are connected through a double pin 8 to a crank arm 2 which is driven and rotated by the wiper motor 1. The reciprocating movements of the links 3 and 4 are transmitted to the wiper blades (not shown) through ordinary connecting pins 9 and 10, shafts 5, and wiper arms 7, so that the wiper blades swing. To connect the links 3 and 4 to the crank arm 2, there is used the double pin 8 having a complicated shape shown in FIG. 2. The construction of the double pin 8 is as follows. A first ball portion 8a and a second ball portion 8b are machined by cutting and grinding from one workpiece, and a portion to be staked 8c is formed by the lower part of said second ball portion 8b. The portion to be staked 8c is securely fixed in a hole in the crank arm 2 with the use of staking, and a knurled portion 8d has a self-locking function so that the portion to be staked 8c can be firmly fixed to the crank arm 2 by staking. However, this double pin 8 suffers from a disadvantage that its complicated shape requires cutting and grinding operations resulting in a high manufacturing cost. Another disadvantage of the double pin 8 is that, when assembling the double pin 8 to the other parts, it is necessary to securely fix the portion to be staked 8c of the double pin 8 to the crank arm 2 by staking, slide the link 3 over the first ball portion 8a to fit the link 3 on the second ball portion 8b, and then fit the link 4 on the first ball portion 8a. This sequence of assembling steps is different from those for the connecting pins 9 and 10, and is disadvantageous from the standpoint of the unification of assembling steps. Although it is required that the shapes and assembling steps of the connecting pins be standardized and unified in order to accomplish a better control of materials and a higher assembling speed, the publicly known wiper device described above cannot meet such a requirement because it must use the double pin 8 which has a special construction and needs special assembling steps.

SUMMARY OF THE INVENTION

The object of this invention is to eliminate the disadvantages described in the foregoing by providing a low-cost wiper device with a simple construction in which a crank arm driven and rotated by a wiper motor and a first link finally connecting to a first wiper blade are connected together by a connecting pin. Said first link has provided thereon at a position adjacent to said connecting pin a connecting pin which is different from the first-mentioned connecting pin and connects said first link to a second link finally connecting to a second wiper blade, and it is possible to use ordinary pins which are easy to manufacture and assemble to other parts as all the connecting pins used in the wiper device including said two connecting pins.

BRIEF DESCRIPTION OF THE DRAWINGS

The object and features of this invention will become more clear by the following description of preferred embodiments taking reference with the attached drawings, in which.

DESCRIPTION OF A PREFERRED EMBODIMENT

Figure 1:
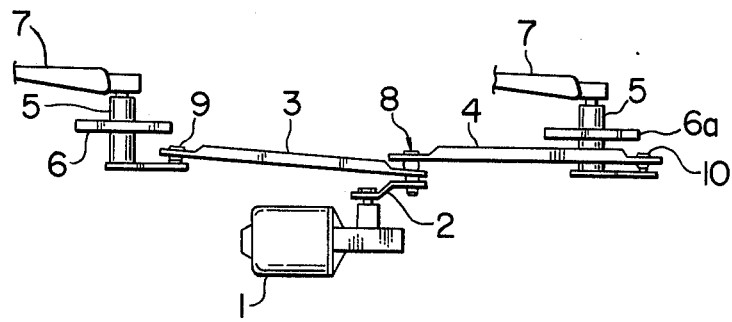
FIG. 1 is a plan view showing a conventional wiper device.
Figure 2:
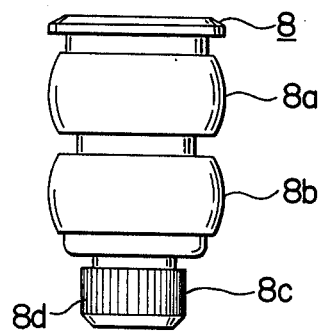
FIG. 2 is a plan view illustrating a double pin used in said conventional wiper device.
Figure 3:
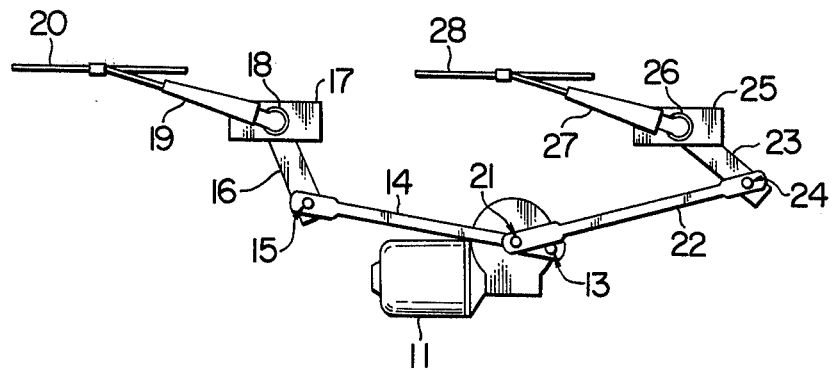
FIGS. 3 and 4 are a front view and a plan view showing a first embodiment of the wiper device according to this invention.
Figure 4:
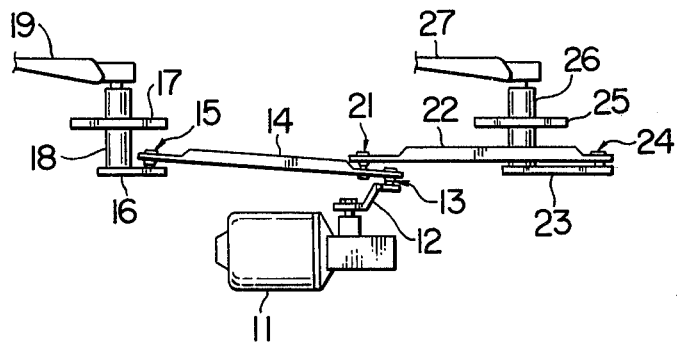
Figure 5:
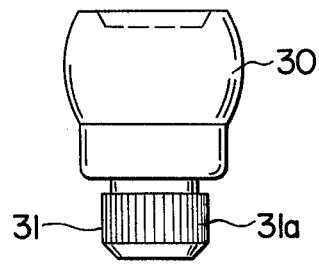
FIG. 5 is a plan view illustrating an embodiment of the connecting pin used in the device according to this invention.
Figure 6:
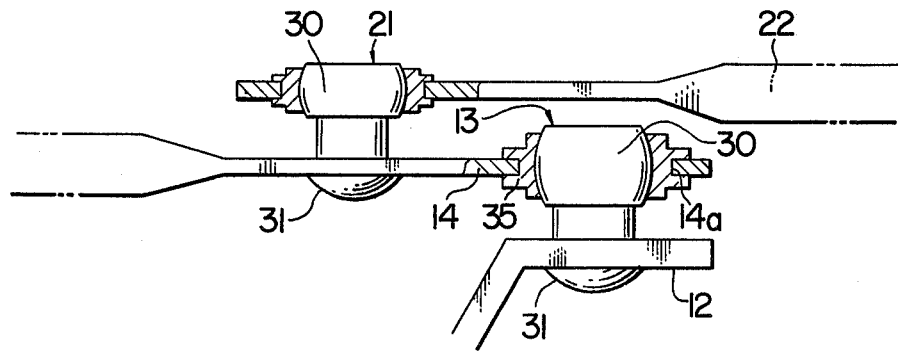
FIG. 6 is a detailed sectional view showing a first connecting pin and a third connecting pin which respectively function as first pin means and second pin means in the device according to this invention.

Hereunder the wiper device according to this invention will be explained with reference to the embodiments shown in the drawings. Referring to FIGS. 3 and 4, the numerals 11 through 13 respectively indicate a wiper motor, a crank arm driven and rotated by the wiper motor 11, and a first connecting pin as first pin means which rotatably connects the crank arm 12 and a first link 14 together. The numeral 15 designates a second connecting pin which rotatably connects the first link 14 and a first swingable lever 16 together. The numeral 17 indicates a first pivot in which a shaft 18 is mounted rotatably. One end of the shaft 18 is connected to the first swingable lever 16 and the other end of the shaft 18 is connected to a first wiper blade 20 through a first wiper arm 19. The numeral 21 designates a third connecting pin as second pin means which is disposed at a position spaced a given distance from the longitudinal axis of the first connecting pin 13, and rotatably connects the first link 14 and a second link 22 together. The numerals 23 through 28 respectively indicate a second swingable lever, a fourth connecting pin rotatably connecting the second swingable lever 23 and the second link 22 together, a second pivot, a second shaft mounted in the second pivot 25, a second wiper arm, and a second wiper blade. In this embodiment, a first wiper blade driving system comprises the second connecting pin 15, the first swingable lever 16, the first pivot 17, the first shaft 18, the first wiper arm 19, and the first wiper blade 20, and a second wiper blade driving system comprises the fourth connecting pin 24, the second swingable lever 23, the second pivot 25, the second shaft 26, the second wiper arm 27, and the second wiper blade 28. Hereunder a detailed explanation will be given to the construction, manufacture, and assembly of the first connecting pin 13, the second connecting pin 15, the third connecting pin 21, and the fourth connecting pin 24. These four connecting pins (hereinafter referred to simply as the connecting pins 13, 15, 21, and 24) each has a ball portion 30 and a portion to be staked 31 provided specially with a knurled portion 31a which functions as a self-locking portion, as illustrated in FIG. 5. When assembling the connecting pins to the other parts, the portion to be staked 31 is securely fixed by staking to one of the members to be connected together (for instance, the crank arm 12), and the ball portion 30 is inserted in a greased synthetic resin case 35 fitted in a hole 14a of the other of the members to be connected together (for instance, the first link 14). These steps are shown in FIG. 6. The ball portion 30 and the case 35 are kept in a connected state by the resilience of the case 35. The connecting pins 13, 15, 21, and 24 can be manufactured with great ease because each of said connecting pins comprising the ball portion 30 and the portion to be staked 31 is much simpler in construction than a double pin. The connecting pin according to this invention can be manufactured by upsetting which cannot be used in manufacturing a double pin. The connecting pin according to this invention can be manufactured by the use of an exclusive header which is widely used for mass-producing bolts and the like. The connecting pin manufactured by this method is a forging enjoying a high strength which is a main feature of a forged product.

Hereunder an explanation will be made on the operation of the first embodiment of the wiper device according to this invention, which has the construction described above. When the wiper motor 11 is energized and rotates, the crank arm 12 is rotated to reciprocate the first link 14 in the directions from left to right and vice versa as viewed in the figure and to swing the first swingable lever 16. The swinging movement of the first swingable lever 16 rotates the first shaft 18, so that the first wiper arm 19 and the first wiper blade 20 are swung and the first wiper blade 20 wipes the surface of the windowpane. The reciprocating movement of the first link 14 is transmitted to the second link 22 through the third connecting pin 21. As the result, the second link 22 reciprocates. The reciprocating movement of the second link 22 is transmitted to the second wiper blade 28 through the fourth connecting pin 24, the second swingable lever 23, the second shaft 26, and the second wiper arm 27, resulting in a swinging movement of the second wiper blade 28.

Figure 7:
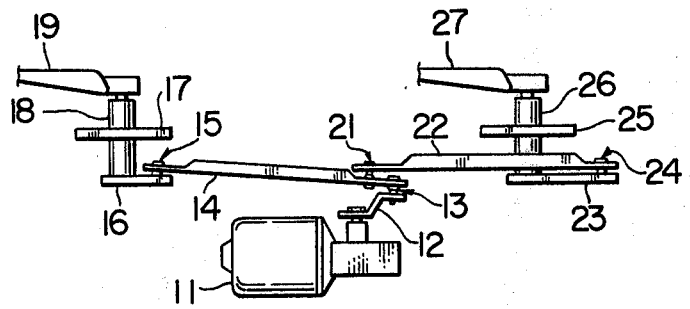
FIGS. 7 and 8 are a plan view and a detailed sectional view illustrating a second embodiment of the device according to this invention.
Figure 8:
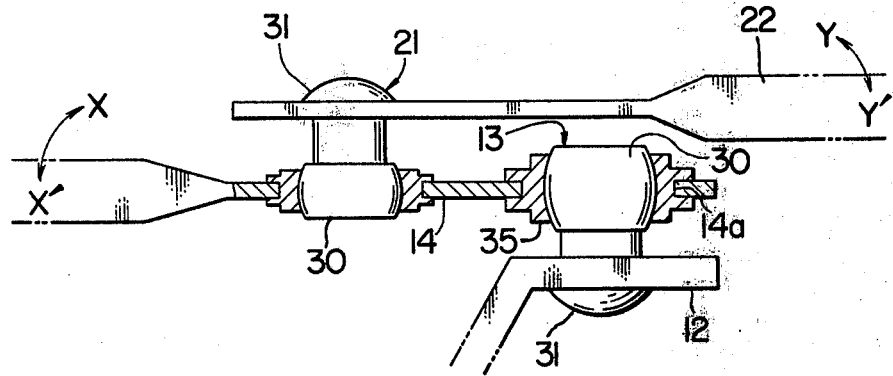

Hereunder a second embodiment of this invention will be explained with reference to FIGS. 7 and 8. A third connecting pin 21 as second pin means employed in the second embodiment is the same in shape as the connecting pin illustrated in FIG. 5, and is used in the same manner as the latter connecting pin except that a portion to be staked 31 of the third connecting pin 21 is securely fixed to a second link 22 by staking, and a ball portion 30 of the third connecting pin 21 is disposed in a first link 14. In FIGS. 7 and 8, like numerals designate like or equivalent parts.

Hereunder an explanation will be given to the operation of the second embodiment having the construction described above. When a crank arm 12 rotates thanks to the rotation of a wiper motor 11, the first link 14 reciprocates in the directions from left to right and vice versa as viewed in the figure to swing a first swingable lever 16. The swinging movement of the first swingable lever 16 rotates a first shaft 18 and swings a first wiper arm 19 and a first wiper blade (not shown), so that the first wiper blade wipes the surface of the windowpane. The reciprocating movement of the first link 14 is transmitted to the second link 22 through the third connecting pin 21 to reciprocate the second link 22. The reciprocating movement of the second link 22 is transmitted to a second wiper blade (not shown) through a fourth connecting pin 24, a second swingable lever 23, a second shaft 26, and a second wiper arm 27, so that the second wiper blade is swung.

During the operation of the wiper device, the first link 14 is subjected to a moving force acting in the directions indicated by the arrow Y-Y' in FIG. 8 on account of a load applied by the second wiper blade on the side of the second link 22. However, the rolling of the first link 14 (the movements in the directions indicated by the arrow X-X' in FIG. 8) can be prevented thanks to the construction that a portion to be staked 31 of a first connecting pin 13 is fixed to the crank arm 12, a ball portion 30 of the first connecting pin 13 is fitted in the first link 14, the portion to be staked 31 of the third connecting pin 21 is fixed to the second link 22, and the ball portion 30 of the third connecting pin 21 is fitted in the first link 14. Referring to FIG. 8, if the second link 22 is subjected to a moving force acting in the directions indicated by the arrow Y-Y', the ball portion 30 of the third connecting pin 21 rotates in the synthetic resin case, and the first link 14 is free from the influence of said moving force. In contrast to this, in the embodiment illustrated in FIG. 6 in which the third connecting pin 21 is securely fixed to the first link 14 by staking and the ball portion of the third connecting pin 21 is rotatably connected to the second link 22, the moving force in the directions Y-Y' in FIG. 8 applied to the second link is transmitted to the first link 14 through the third connecting pin 21 to roll the first link 14 in the directions indicated by the arrow X-X'. This rolling is due to the fact that the moving force in the directions Y-Y' is converted into a couple of forces in the directions X-X', because there is an offset between the center of the ball portion fitted in the first link 14 and the center of the ball portion fitted in the second link 22. However, in the device according to this invention shown in FIG. 8, there is no such an offset since the center of the ball portion of the third connecting pin 21 and the center of the ball portion of the first connecting pin 13 are arranged on the same axis extending in the direction from left to right as viewed in FIG. 8. Therefore, when the second link 22 is subjected to the moving force acting in the directions indicated by the arrow Y-Y' in FIG. 8, the ball portion 30 of the third connecting pin 21 rotates in the synthetic resin case, so that no rolling movement is imparted to the first link 14 and the first wiper blade is free from the adverse influence of rolling such as the change of wiping area.

As has been described in the foregoing, in the wiper device according to this invention in which the wiper motor is disposed intermediate between the first pivot and the second pivot, and the wiper motor rotates the crank arm to reciprocate the first link and the second link, the crank arm and the first link are connected together by a connecting pin, and the first link and the second link are connected together by another connecting pin arranged at a position which is on the first link and is adjacent to the first-mentioned connecting pin, so that the crank arm is connected to the first link and the second link. Thanks to this construction, the wiper device according to this invention enjoys an advantage that connecting pins of the same shape can be used as said two connecting pins and two connecting pins carrying the other ends of the first and second links, resulting in great ease in material control and assembling operation. Another outstanding advantage of the wiper device according to this invention is that said four connecting pins may be an ordinary connecting pin which can be mass-produced by a header at a low manufacturing cost, with the result that the wiper device can be rendered very inexpensive.

What is claimed is:

1. An improvement in a wiper device for wiping the windowpanes of cars, ships, and the like by wiper blades reciprocally movable in a synchronized manner through pivotally mounted wiper arms, comprising driving means including a wiper motor arranged between the wiper arms centrally of their pivot points, a crank arm connected at one of its ends to the driving means and having securely fixed to the opposite end thereof first pin means provided with a ball portion, a single first link means rotatably mounted at one of its ends on the ball portion of the first pin means and operatively connected at its opposite end to one of said wiper arms to impart a swinging movement to the wiper arm about its pivot point when said wiper motor is actuated, second pin means connected to the first link means intermediate its ends at a location adjacent to the mounting between the first pin means and said first link means, said second pin means also being connected to a second link means, said second pin means having a ball portion to which one of said link means is rotatably fitted, said second link means being connected to the other of said wiper arms to impart a swinging movement to said other wiper arm about its pivot point in synchronism with movement of the first link means, the driving force to said second link means being transmitted through the first link means.

2. An improvement in a wiper device according to claim 1 wherein said first link means is connected rotatably to the ball portion of said second pin means.

3. An improvement in a wiper device according to claim 1 wherein said second link means is connected rotatably to the ball portion of said second pin means.

* * * * *